United States Patent [19]

Martija

[11] Patent Number: 4,995,570

[45] Date of Patent: Feb. 26, 1991

[54] REEL BRAKE ASSEMBLY ACTUATED BY LINEAR STEPPER MOTOR

[75] Inventor: Henry M. Martija, La Verne, Calif.

[73] Assignee: Datatape Incorporated, Pasadena, Calif.

[21] Appl. No.: 317,381

[22] Filed: Mar. 1, 1989

[51] Int. Cl.$^5$ .................. G11B 15/22; B65H 26/04
[52] U.S. Cl. .................................... 242/193; 242/204
[58] Field of Search ............... 242/193, 192, 203, 204, 242/99, 75.4, 75.44; 188/162

[56] References Cited

U.S. PATENT DOCUMENTS

| | | | |
|---|---|---|---|
| 1,170,840 | 2/1916 | Morse | 242/75.44 |
| 2,877,012 | 3/1959 | Angel et al. | 242/75.44 |
| 3,006,566 | 10/1961 | Loewe | 242/204 |
| 3,386,681 | 6/1968 | Waterhouse et al. | 242/75.44 |
| 3,638,881 | 2/1972 | Mirkovic | 242/204 |
| 3,664,609 | 5/1972 | McMillin, Jr. | 242/204 |
| 3,913,145 | 10/1975 | Wiig | 242/198 X |
| 4,079,899 | 3/1978 | Vogel | 242/192 |
| 4,532,462 | 7/1985 | Washbourn et al. | 188/162 X |
| 4,542,864 | 9/1985 | Hart | 242/193 |
| 4,736,899 | 4/1988 | Murasaki | 242/86.5 X |

FOREIGN PATENT DOCUMENTS

| | | | |
|---|---|---|---|
| 77699 | of 1919 | Austria | 188/162 |
| 630465 | 10/1978 | U.S.S.R. | 188/162 |

*Primary Examiner*—Daniel P. Stodola
*Assistant Examiner*—John P. Darling
*Attorney, Agent, or Firm*—William F. Noval

[57] ABSTRACT

In a magnetic tape recording/reproducing apparatus, magnetic tape is transported between supply and take-up reels which include reel brake assemblies which are simple, reliable and compact. The brake assembly includes a linear stepper motor and a brake pad mounted on a linearly actuated shaft of the stepper motor. Each reel is mounted on a hub driven by a belt and pulley arrangement. Each reel brake assembly is mounted adjacent the pulley with the motor shaft extending radially relative to the pulley. Upon actuation of the linear stepper motor, the motor shaft is moved radially to engage the brake pad with the pulley. In a preferred embodiment, the magnetic tape recording/reproducing apparatus includes coaxial reels which are driven by coaxially mounted pulleys having individual brake assemblies.

6 Claims, 2 Drawing Sheets

REEL BRAKE ASSEMBLY ACTUATED BY LINEAR STEPPER MOTOR

BACKGROUND OF THE INVENTION

This invention relates in general to magnetic tape recording/reproducing apparatus and, more particularly, this invention relates to a new and improved brake assembly for the supply and take-up reels of magnetic tape recording/reproducing apparatus.

Helical scan magnetic tape recording/reproducing apparatus are widely used to record analog or digital information on slant tracks on magnetic tape. Generally, the magnetic tape is transported between supply and take-up reels past a rotary head scanner. The supply and take-up reels may be mounted on the apparatus either in a coplanar relationship or in a coaxial relationship. As the magnetic tape is transported, it is necessary to maintain a uniform tension on the tape in order to effect accurate recording and reproducing of information relative to the tape. Moreover, since the tape may be transported between the reels at different speeds and in forward and reverse directions, the tension applied to the tape must be changed to accommodate such changes in speed and direction. Typically, tension is maintained by applying a braking torque to the supply reel. A reel brake is also utilized to bring the reel to a stop when the recording/reproducing apparatus is operated in a mode requiring the tape to be stopped.

It is desirable that a reel braking arrangement be simple, effective and reliable for the application for which it was designed. Moreover, with the ever increasing compactness of magnetic tape recording/reproducing apparatus, it is desirable that a reel braking arrangement be as compact as possible. Known reel braking arrangements, generally, do not satisfy all of these requirements. Thus, U.S. Pat. No. 3,638,881 issued Feb. 1, 1972 Inventor Mirkovic; U.S. Pat. No. 4,079,899, issued March 21, 1978, Inventor Vogel; and U.S. Pat. No. 4,542,864, issued Sept. 24, 1985, Inventor Hart, disclose a braking arrangement for a reel including a braking shoe mounted on a lever which is pivoted at one end and connected at its other end to a spring and solenoid. Such arrangements are mechanically complex requiring several mechanical elements which are subject to breakdown. Moreover, such arrangements are space consuming and not efficiently used in magnetic tape recording/reproducing apparatus where space is at a premium.

SUMMARY OF THE INVENTION

According to the present invention, there is provided a reel brake assembly which is simple, effective, reliable and compact. According to a feature of the present invention, a reel brake assembly includes a linear stepper motor having a shaft upon which a brake pad is mounted. The brake assembly is located so that the linear movement of the brake pad is radial to the axis of rotation of a reel. Thus, braking action is direct. Moreover, the linear stepper motor provides more efficient, reliable and versatile braking actuation than a solenoid. According to another aspect of the present invention, magnetic tape recording/reproducing apparatus includes coaxially mounted supply and take-up reels. The reels are driven by separate belt and pulley arrangements. A reel brake assembly according to the present invention is located between the runs of each belt. The brake pad radially engages the pulley to brake the corresponding reel.

BRIEF DESCRIPTION OF THE DRAWINGS

The invention will be described with reference to the accompanying drawings wherein like numbers are used with like elements.

DETAILED DESCRIPTION OF THE PREFERRED EMBODIMENT

Figure 1:
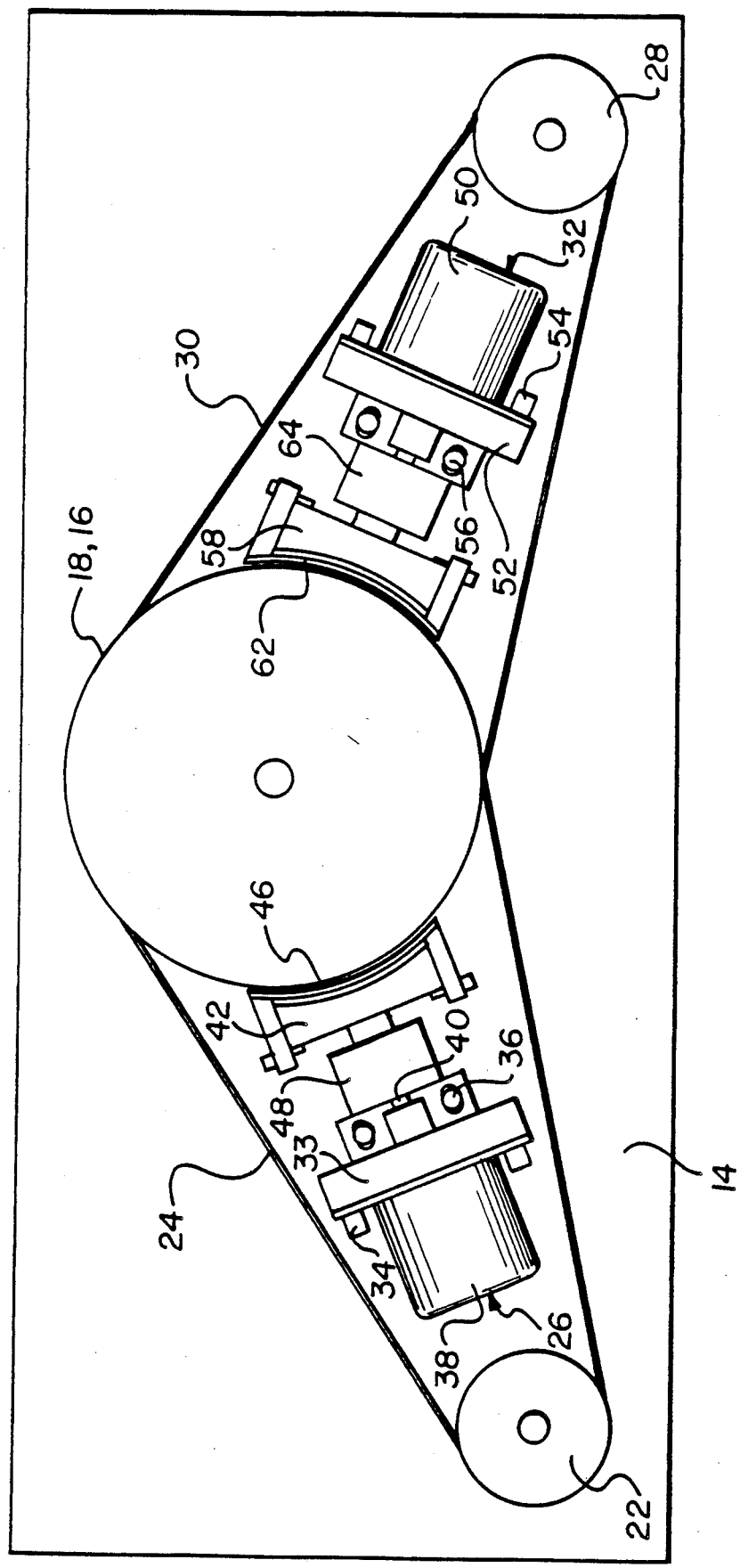
FIG. 1 is a plan view of components of a drive system for a coaxial reel magnetic tape recording/reproducing apparatus including an embodiment of the reel brake assembly according to the present invention.
Figure 2:
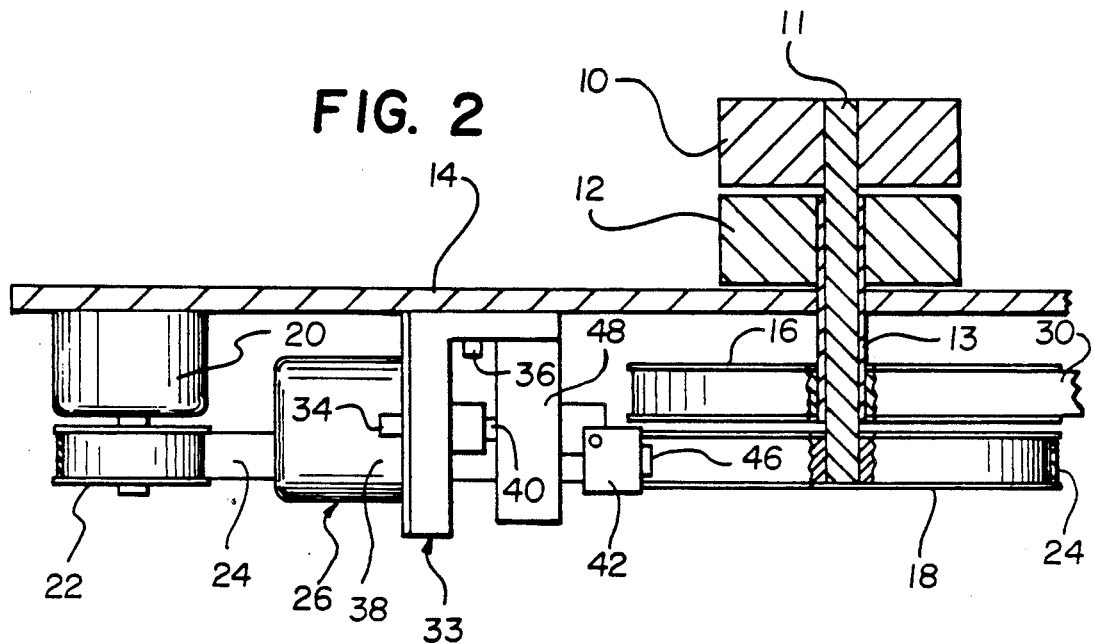
FIG. 2 is a partially sectional, side elevational view of a part of the system of FIG. 1.

Referring to FIGS. 1 and 2, there is shown magnetic tape recording/reproducing apparatus including coaxial reel hubs 10 and 12 for mounting respective supply and take-up reels (not shown). Reel hubs 10 and 12 are mounted respectively on coaxial shafts 11 and 13 journalled on member 14. Drive pulleys 16 and 18 are mounted on shafts 13 and 11, respectively. A reel drive motor 20 drives pulley 18 and reel hub 10 by means of motor pulley 22 and a timing belt 24, which is trained about pulley 22 and pulley 18. A reel brake assembly 26, according to the present invention, is located between the spans of belt 24 and provides braking action to pulley 18 and consequently to reel hub 10.

A similar drive arrangement is provided for reel hub 12. It includes a motor pulley 28 driven by a motor (not shown) and a timing belt 30, which is trained about motor pulley 28 and reel pulley 16 which drives reel hub 12 through shaft 13. A reel brake assembly 32, according to the present invention, is mounted between the spans of belt 30.

Figure 3:
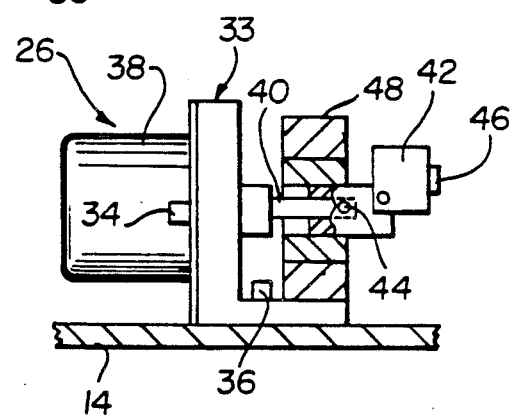
FIGS. 3 and 4 are partially sectional, side elevational views of the reel brake assemblies shown in plan view in FIG. 1.

As shown in greater detail in FIG. 3 (with reference to FIGS. 1 and 2), reel brake assembly 26 is mounted on bracket 33 by means of fasteners 34. Bracket 33 is mounted on member 14 by means of fasteners 36. Reel brake assembly 26 includes linear stepper motor 38 having a shaft 40. Linear stepper motor 38 may be of the type supplied by the Airpax Corporation, Cheshire, Conn. Brake pad mounting member 42 is secured to shaft 40 by means of set screw 44 and has a brake pad 46 mounted on its end. Member 42 is slidably mounted by housing 48 mounted on bracket 33. Brake pad 46 is arcuate in shape and is mounted to engage a region of pulley 18 which is not contacted by belt 30. Shaft 40 is radially mounted with respect to pulley 18. Actuation of shaft 40 by linear stepper motor 38 effects radial braking action on pulley 18 by brake pad 46. Thus, braking action is effected in a simple and direct manner, without the use of complex linkage mechanisms which are subject to breakdown. The brake assembly is compact, permitting it to be mounted between the spans of timing belt 24.

Figure 4:
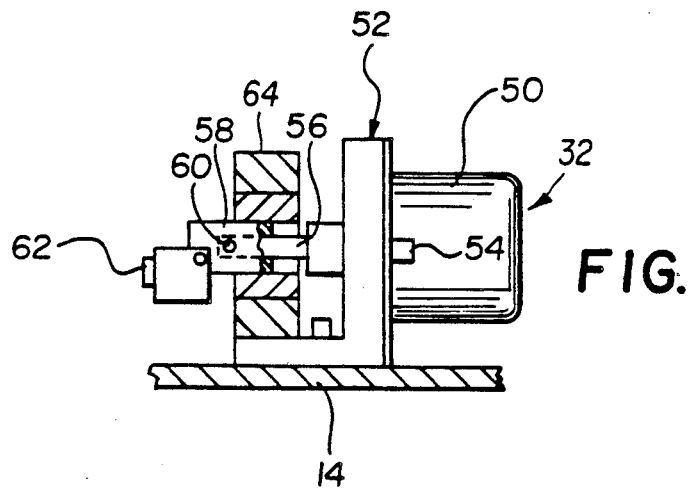

Referring now to FIG. 4 (with reference to FIGS. 1 and 2), brake assembly 32 is similar in construction to brake assembly 26. As shown, brake assembly 32 includes linear stepper motor 50 mounted on bracket 52 by means of fasteners 54. Stepper motor 50 has a shaft 56 on which is mounted brake pad mounting member 58 by means of set screw 60. Member 58 is slidably mounted by housing 64 mounted on bracket 52. Member 58 mounts arcuate brake pad 62 which engages pulley 16 to apply braking action thereto.

Reel brake assembly 32 is mounted between the spans of timing belt 30. Linear actuator motor 50 actuates shaft 56 to cause brake pad 62 to apply a radial braking force to pulley 16.

It will be noted that brake assemblies 26 and 32 are substantially identical except for the axial displacement of brake pads 48 and 62, which engage axially displaced pulleys 16 and 18.

The invention has been described in detail with reference to the figures, however, it will be appreciated that variations and modifications are possible and contemplated within the scope and spirit of the invention.

What is claimed is:

1. In magnetic recording/reproducing apparatus, the invention comprising:
    a reel hub for supporting a reel of magnetic tape;
    a rotatably mounted shaft upon which said reel hub is mounted;
    a cylindrical drive member mounted on said shaft;
    a linear stepper motor mounted adjacent to said brake member; said motor having a shaft extending radially of said cylindrical drive member; and
    an arcuate brake pad mounted on said motor shaft adjacent to said cylindrical drive member, wherein actuation of said linear stepper motor causes linear movement of said shaft to effect direct radial braking engagement between said brake pad and said drive member 2. The invention of claim 1 wherein said cylindrical drive member forms a drive belt pulley about which a drive belt is trained, and wherein said brake pad is substantially coplanar with said pulley, and is adapted to engage said pulley in the same arcuate region normally contacted by said drive belt.

3. In magnetic tape recording/reproducing apparatus, the invention comprising:
    first and second coaxial reel hubs for supporting first and second reels of magnetic tape;
    first and second rotatably mounted coaxial shafts upon which said first and second reel hubs are mounted;
    first and second cylindrical drive members respectively mounted on said first and second shafts;
    a first linear stepper motor mounted adjacent to said first drive member, said first motor having a shaft extending radially of said first cylindrical drive member; said first motor shaft mounting a first arcuate brake pad adjacent to said first cylindrical drive member, wherein actuation of said first linear stepper motor causes linear movement of said first motor shaft to effect direct radial braking engagement between said first brake pad and said first drive member; and
    a second linear stepper motor mounted adjacent to said second drive member, said second motor having a shaft extending radially of said second cylindrical drive member; said second motor shaft mounting a second arcuate brake pad adjacent to said second cylindrical brake member, wherein actuation of said second linear stepper motor causes linear movement of said second motor shaft to effect direct radial braking engagement between said second brake pad and said second drive member.

4. The invention of claim 3 wherein said first and second cylindrical drive members form first and second drive belt pulleys about which respective first and second drive belts are trained, and wherein said first and second brake pads are axially spaced from one another but are substantially coplanar respectively with said first and second pulleys and are adapted to engage their respective pulleys in the same arcuate regions normally contacted by said respective drive belts.

5. The invention of claim 4 including first and second rotatably mounted motor pulleys respectively spaced from said first and second drive belt pulleys; wherein said first drive belt is trained about said first drive belt pulley and said first motor pulley and forms spaced spans between said first pulleys; wherein said second drive belt is trained about said second drive belt pulley and said second motor pulley and forms spaced spans between said second pulleys; wherein said first linear stepper motor is located between said spaced spans of said first drive belt; and wherein said second linear stepper motor is located between said spaced spans of said second drive belt.

6. In magnetic recording/reproducing apparatus, the invention comprising:
    a hub for supporting magnetic media;
    a rotatably mounted shaft upon which said hub is mounted;
    a drive pulley mounted on said shaft;
    a rotatably mounted motor pulley spaced from said drive pulley;
    a belt which is trained about said drive pulley and said motor pulley and which forms spans between said pulleys; and
    a brake assembly located between the spans of said belt; said brake assembly including a linear stepper motor having a linearly actuated shaft extending radially of said drive pulley and a brake pad mounted on the end of said shaft adjacent to said drive pulley; wherein actuation of said linear stepper motor causes linear movement of said motor shaft to effect direct radial braking engagement between said brake pad and said drive pulley, said brake pad engaging said drive pulley in the same circumferential region normally contacted by said belt.

* * * * *